United States Patent [19]

Noble

[11] 4,155,526
[45] May 22, 1979

[54] RAILROAD CAR WHEEL MEASURING APPARATUS

[75] Inventor: Peter M. Noble, Valencia, Pa.

[73] Assignee: Westinghouse Air Brake Company, Swissvale, Pa.

[21] Appl. No.: 849,822

[22] Filed: Nov. 9, 1977

[51] Int. Cl.² .............................................. B61L 3/10
[52] U.S. Cl. .................................. 246/249; 104/26 B; 246/182 A; 364/562
[58] Field of Search ................... 33/203.11; 73/8, 146; 104/26 A, 26 B; 246/77, 169 R, 169 D, 182 A, 247, 249; 324/179, 206; 340/38 L, 195, 146.3 K; 364/438, 561–563; 235/92 DN

[56] References Cited

U.S. PATENT DOCUMENTS 3,474,542  10/1969  Walton ......................... 246/169 R X
3,844,513  10/1974  Bernhardson et al. .......... 246/249 X

FOREIGN PATENT DOCUMENTS 1194892  6/1965  Fed. Rep. of Germany ...... 246/169 R
1267700  5/1968  Fed. Rep. of Germany ...... 246/169 R Primary Examiner—Stephen G. Kunin
Attorney, Agent, or Firm—A. G. Williamson, Jr.; R. W. McIntire, Jr.

[57] ABSTRACT

A plurality of sensors, each generating distinct signals in response to the passage of leading and trailing edges of car wheels, are positioned along the rail at a height above the rail to detect the passage of a selected chord on the wheel tread. The distances between initial sensors and the final unit equal the various selected chord lengths on conventional sized wheels. When one of the initial sensors detects the passage of the trailing edge of the wheel at the chord level simultaneously with the detection of the leading edge of that wheel by the last unit, the output signals are applied to a logic circuit, which registers a wheel of corresponding diameter. Additional sensors placed immediately adjacent the final sensor provide measurement of actual wheel diameters slightly less than the standard sizes due to wheel wear. When the sensors detect a gap in the tread chord, as a worn wheel passes, greater than a predetermined length for each diameter wheel, an indication is provided of a worn wheel requiring replacement. A second set of sensors positioned on the other side of the rail measures the flange height to also indicate wheel wear. All measurements are determined by logic elements and supplied to the yard control system. The diameter and tread thickness measurements are used to supply a corresponding wheel rotational inertia factor to the speed control system while tread and flange wear indications indicate cars requiring immediate wheel replacements.

13 Claims, 6 Drawing Figures

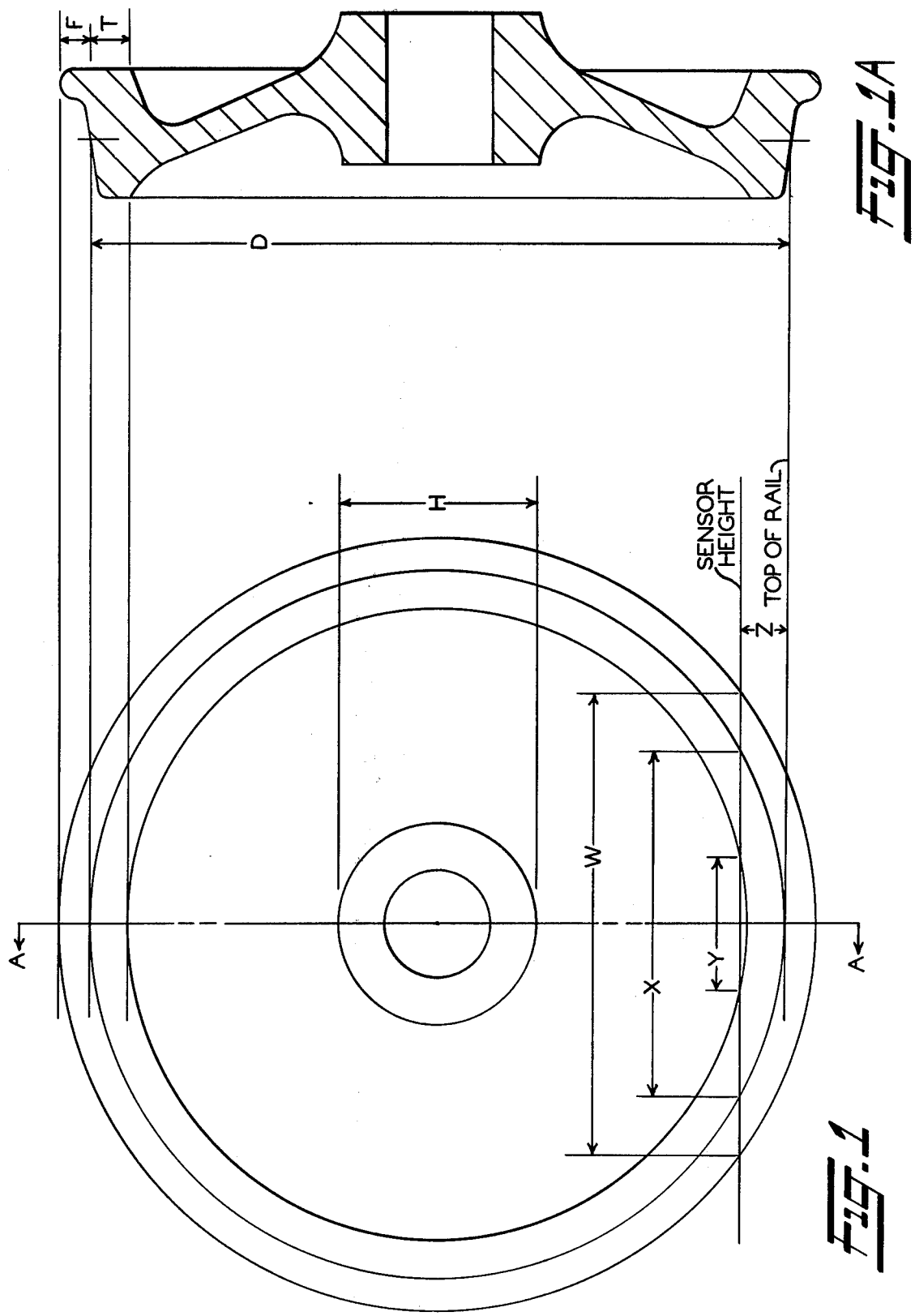

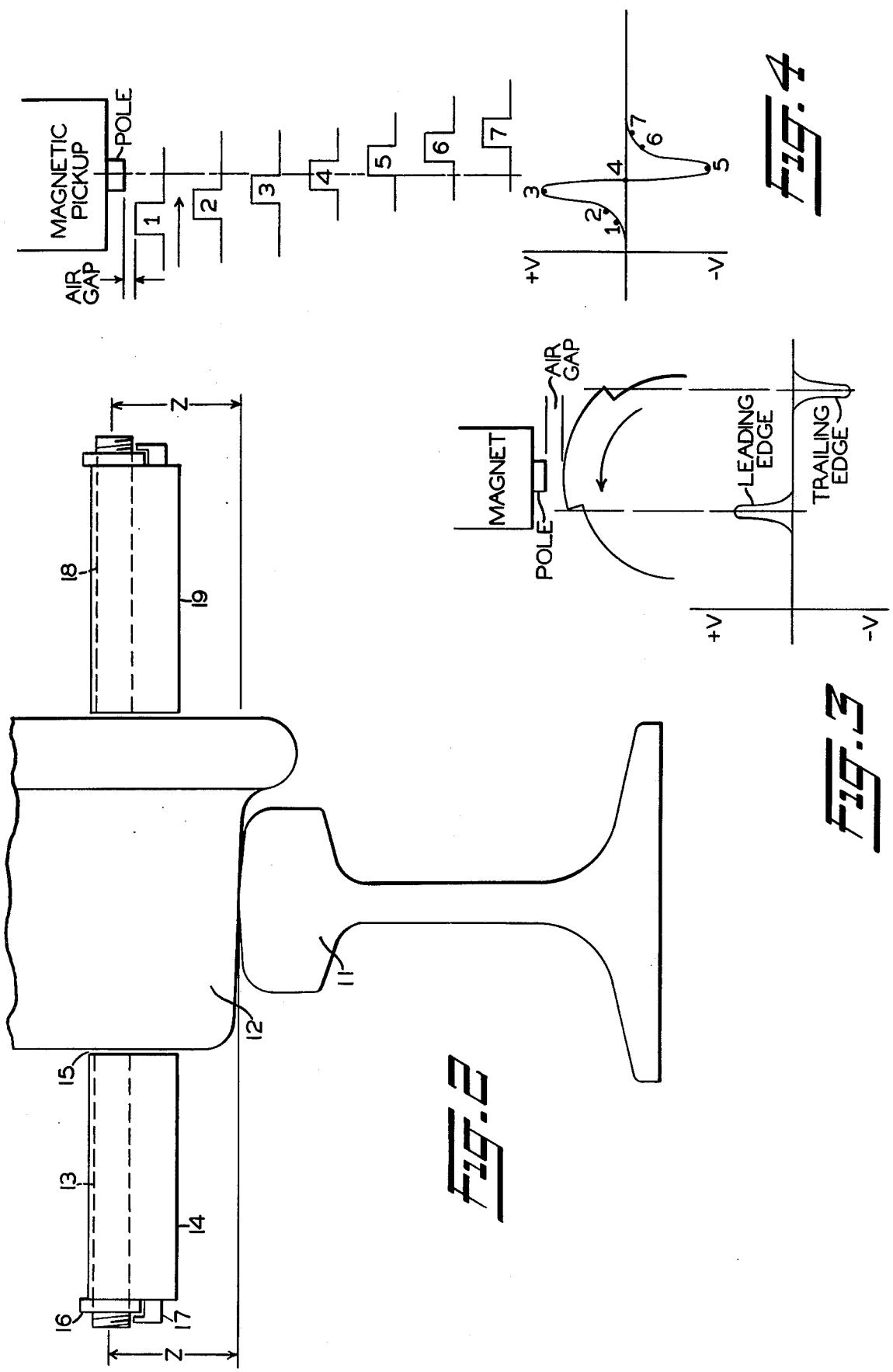

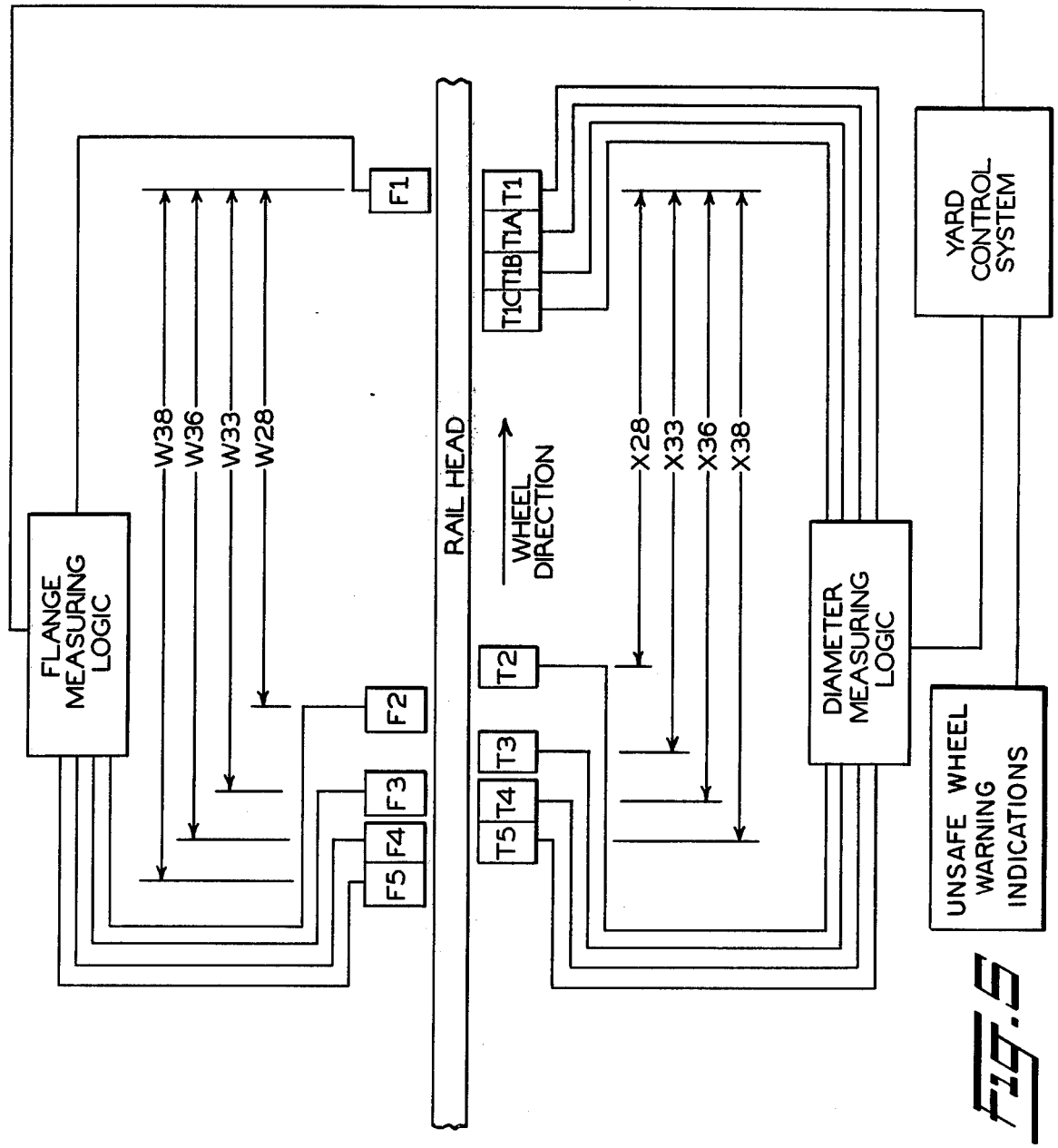

RAILROAD CAR WHEEL MEASURING APPARATUS

BACKGROUND OF THE INVENTION

My invention pertains to apparatus for measuring selected parameters on railroad car wheels. More specifically, the invention pertains to apparatus for measuring the diameter of railroad car wheels and determining the radial tread thickness and flange height in order to provide a rotational inertia factor.

Present railroad classification yard speed control systems measure or determine various parameters of railroad cars being humped and whose speed is to be controlled. The systems also measure or otherwise predetermine various yard and track parameters. These elements of information are fed into the process control computer which determines the speed at which a car or cut of cars should leave the final retarder to couple with preceding cars in a designated track at a safe coupling speed. At present, the car parameters determined include the weight class of the car, its rolling resistance on both curved and tangent track, the length of the car or cut, and the number and spacing of wheel-axle units. The yard and track parameters include the slope and curvature of the various tracks, the distance-to-go to coupling, and wind or weather conditions. One car parameter presently not measured but factored into the computations from stored standard values is the rotational inertia of the car wheels. This parameter is proportional to wheel diameter and the wheel tread or rim radial thickness. In general, the larger the wheel diameter, the greater the rotational inertia. This factor tends to effect the downhill rolling resistance, slowing the initial acceleration as a car leaves the hump but prolonging its movement in the flatter storage tracks. The effect is more pronounced on light weight or empty cars. There is also a difference in the retarder effectiveness in slowing down the cars proportional to wheel diameters, smaller wheels providing more effective retardation. Thus, a next step toward improving the operation of the automatic classification yard is to automatically provide to the computer control apparatus a measurement of the diameter and the radial tread thickness of the wheels of each car. This information may be used to determine or establish the rotational inertia of the wheels on that car, which factor is then entered into the retarder speed control computations. Such apparatus could also indicate the safety condition of the wheel, i.e., the radial thickness or depth of the tread and the height of the flange, both of which must be within certain predetermined limits. Apparatus is available in the art to individually measure these parameters and indicate whether the safety conditions are satisfied but a combined apparatus will have a distinct advantage particularly when it provides the wheel diameter measurements for rotational inertia determination.

Accordingly, an object of my invention is apparatus to automatically measure selected parameters of the wheels of moving railroad cars.

Another object of the invention is an arrangement for measuring the diameter of a railroad car wheel while it is rolling along a track rail.

Another object of my invention is apparatus to measure the diameter of a railroad car wheel moving along a track rail and also determine if the wheel flange is in a safe condition.

A still further object of the invention is an arrangement for determining, through measurement of selected parameters, the rotational inertia of a railroad car wheel while it moves along a stretch of track rail.

A further object of the invention is a railroad car wheel measuring means using a plurality of sensors mounted along the rail to detect the passage of selected points on a wheel and logic means to register the diameter of the wheel in accordance with the time and order of detection.

It is also an object of my invention to provide means for measuring selected parameters of a railroad car wheel as it moves along a track rail to register indications of wheel diameter, radial tread thickness and flange height to determine whether tread and flange parameters are within safety limits.

Still another object of the invention is an arrangement of apparatus for providing indications of the rotational inertia of a railroad car wheel and the safety condition of the wheel by measurements of selected parameters while the wheel is moving along a track rail.

Other objects, features, and advantages of my invention will become apparent from the following description and accompanying drawings when taken with the appended claims.

SUMMARY OF THE INVENTION

In practicing the invention, a plurality of sensing devices are positioned in succession along the railroad track rail to detect the passage of the wheel or at least selected portions of a wheel. Several types of sensors are usable and the specific showing is of a magnetic proximity type, i.e., a magnetic pickup sensor which detects the initial passage of a mass of metal and the passage of the trailing edge of that metal, outputting a distinctive signal for each event. The sensors are mounted in a bar so as to be positioned a selected height above the top of the rail. This height is selected to approximate the inner edge of the tread portion of the wheels on the majority of the cars traveling the track. It is to be noted that, if various safety checks are to be included in the arrangement, sensors must be mounted along both rails and on each side of each rail. As specifically shown, the master sensing unit is placed at a selected location to be the final unit passed as a car moves in a normal direction. The remaining sensors are so spaced from this final unit, in succession along the approach, so that the distance along the chord of the wheel at the sensor height represents the diameter on the corresponding wheel. As will become obvious, the order of the sensors may be reversed if desired. Whatever the type of sensors used, each must output a distinctive signal as the initial point on the wheel passes its location and another or second distinctive signal as the final point on the chord of the wheel passes that location. These output signals are applied to a logic circuitry arrangement which determines the specific sensor outputting a final point signal simultaneously with the initial point signal output by the final sensor. This comparison of the simultaneous signals actuates a registry of a wheel diameter indication corresponding to the measured chord. This wheel diameter registry is then supplied to the yard control system and specifically the speed control portion so that the rotational inertia factor for the wheels of that car may be determined and used, combined with other previously mentioned car and yard factors, in computing the retarder leaving speed to achieve a safe coupling for that particular car at its destination in the yard.

By positioning a similar plurality of sensors on the other side of the rail with slightly longer spacing between the corresponding pairs, a detection of the wheel flange diameter may be accomplished which is convertable, in connection with the registered tread diameter, into a flange height measurement. This may be used to provide an indication of wear of the flange below a proper height required for safety purposes. This arrangement, however, will not necessarily detect pieces broken out of the flange unless they happen to coincide with a sensor position. This flange measurement can also be correlated with the tread diameter registry for additional safety checks. If the tread is worn below certain selected limits, the sensors in the first plurality will detect an opening or gap in the wheel chord as it passes the measuring point although, for some wheel diameters, this gapping will always occur. However, by comparing the measured length of the gap with the final chord or diameter measurement, the amount of tread wear may be determined to actuate, if necessary, a warning indication of unsafe conditions requiring a wheel change. These indications may be controlled within the logic circuit arrangement or by the yard control system in accordance with the registered measurements.

BRIEF DESCRIPTION OF THE DRAWINGS

I shall now describe in detail a specific arrangement for measuring railroad wheel parameters embodying one preferred form of the invention and then define the novel features thereof in the appended claims. In describing the specific illustrated form, reference will be made to the accompanying drawings in which:

FIG. 1 is a schematic illustration in outline form of the face of a railroad car wheel looking toward the car.

FIG. 1A is a cross-sectional view of a railroad car wheel along line A—A of FIG. 1.

FIG. 2 is an end view of a portion of a car wheel and a rail on which it is rolling showing also the mounting of sensor devices along each side of the rail.

FIG. 3 is a chart illustrating output signals obtainable from a magnetic pickup sensing device when a cam projection on a rotating disk passes by the magnet pole.

FIG. 4 is another chart schematically illustrating the output wave from a magnetic pickup sensor device as a wheel passes the wayside position of the sensor device.

FIG. 5 is a schematic illustration of an apparatus arrangement for measuring car wheel parameters such as diameter, flange height, and tread depth.

In each of the drawings, similar references designate the same or similar parts of the apparatus.

DESCRIPTION OF THE ILLUSTRATED EMBODIMENT

Referring now to FIG. 1, the outer or tread face, i.e. looking towards the car, of a conventional railroad car wheel is shown in outline form. A cross section along line A—A of FIG. 1 is shown in FIG. 1A and represents the standard shape for a railroad car wheel as taken from published official car wheel diagrams. It may be noted that the car wheel, as shown in FIG. 1A, comprises various parts beginning with the hub, having a diameter H, into which the axle fits. A disc portion of the wheel is next outward from the hub. Further outward is the tread or rim portion with a radial thickness represented by the distance T followed by the flange with a height F. The outer surface of the wheel tread rides on the head or top of the rail as indicated schematically in both FIGS. 1 and 1A.

The moment of inertia of an irregularly shaped disc such as a railroad car wheel can be calculated on the basis of concentric rings, each ring representing a grouping of one of the irregular shapes comprising, from a sectional point of view, the total mass. For a railroad car wheel, the hub, the disc, the tread, and the flange, as shown in FIG. 1A, are appropriate groupings of concentric rings of mass. The moment of inertia of a small piece of mass rotating about an axis is proportional to the square of the radius or distance from the mass to the axis of rotation. Because of this square relationship, the most significant contribution to the total moment of inertia (rotational) of the axle-wheel combination of a railroad car comes from the mass represented by the wheel tread. Thus, by obtaining a measurement of the wheel diameter and the tread radial thickness by means of appropriate sensors, a reliable proportional measure of the total moment of rotational inertia of the wheel-axle assembly can be provided.

It is then obvious that the important dimensions for determining wheel rotational inertia are, as shown in FIG. 1A, the wheel diameter D, the radial tread thickness T, and the height of the flange F. Therefore, measurement of determination of one or more of these dimensions is required to provide the data necessary to calculate or otherwise determine the rotational inertia of the wheel. It is impractical to measure these, particularly the wheel diameter, at the rail level. Thus, the measurement is made at a selected height Z above the top or head of the rail as shown in FIG. 1. In the wheel outline shown in FIG. 1, the middle of the three outer concentric rings represents the circumference of the rail contact point on the wheel tread, as may also be determined by reference to FIG. 1A. It is to be noted that a measurement of the distance X, which is a chord on the circumference of the tread at this rail contact point, can be used as an indication of the wheel diameter D. In other words, mounting detection means or sensor devices at the height Z above the top of the rail to detect the passage of the initial, i.e., the right, and the final, or left, points on this chord X will give a relative measure of wheel diameter. Since only a relatively few standard wheel sizes are used by the railroads, it is possible to provide a limited number of sensors at selected points along the rails to detect the passage of the initial and final points of chord X and thus provide a measurement of wheel diameter.

Each standard size car wheel has a corresponding standard tread height in its unworn condition. Thus, a measure of the wheel diameter D enables a reading from a table of standard values to provide a measure of the rotational inertia of the wheel. However, by use of additional sensors and sensing logic, a measurement of the tread thickness can also be obtained. This measurement is then used to improve the accuracy of the moment of inertia determination based on wheel diameter alone. Measurement of tread heights (rim thickness) in conjunction with wheel diameter also results in sufficient information to determine whether a wheel is within operational limits or has become worn beyond the condemning limits. In addition, by the use of additional appropriate sensors to establish a measure of the chord W show in FIG. 1, a flange height F can be determined. This height is an important wheel inspection dimension and thus the measuring device becomes an in-motion wheel dimension inspection means.

Various types of detection or sensor devices are available for use to detect the passage of points on a car wheel defining such chords as W, X, and Y shown in FIG. 1. Appropriate sensors might include fluidic proximity detectors, heat sensitive devices, magnetic proximity detectors, strain gages, and capacitive or reluctance type proximity detectors. The sensor devices are mounted on a bracket bar or within a beam positioned along the rail so that the devices are at the height Z above the rail head and at whatever spacing from the passing wheel is required for operation by the specific device selected. For the following specific description, I have chosen to use a magnetic proximity or pickup type detector mounted inside a bar positioned along the rail in close proximity to the car wheels moving along the rail. This type of sensor device must be close to the wheel mass to properly detect its passage.

Referring to FIG. 2, the cross section of a rail designated by the reference 11 is shown along which the railroad car wheels, illustrated by the portion of a wheel 12, move perpendicular to the drawing plane. A magnetic proximity detector shown by the conventional dashed block 13 is mounted at the left within a bar or beam 14, to register the parameters such as the passage of chords X and Y from FIG. 1. Bar 14 extends longitudinally along rail 11 and is made of high strength, high hardness, nonmagnetic material such as, for example, heat treated aluminum bronze. These high strength, high hardness characteristics give bar 14 a longer life with minimum wear under difficult conditions of use due to the close spacing between the bar and sensor combination and the wheel face as illustrated by the small air gap 15. The specific details for mounting the magnetic pickup sensor 13 within bar 14 are not shown except for a nut 16 and lock nut 17 which permit adjustment and maintenance. It is to be noted that the center line of sensor 13 is at the height Z above the top of rail 11. To measure the chord or parameter W of the wheel, a similar arrangement is needed on the other side of the rail as shown by the sensor 18 mounted within a bar 19 in a similar manner. This second sensor arrangement on the other side is needed since this type of sensor device will detect a mass of metal only at very close proximity, i.e., with a small air gap, as shown at 15, between the sensor device and the face of the wheel, so that the outside sensor 13 is not able to detect metal protrusions as far away as the wheel flange.

To assist in an understanding of the remaining description, typical characteristics of a magnetic pickup type sensor device are illustrated in FIGS. 3 and 4. FIG. 3 is a schematic illustration of a rotating disc with a raised, cam-like projection. This disc rotates in proximity to the magnetic device which is responsive only to the passage of the projection to generate output signals. The $+V$ signal is generated when the leading or initial edge of the cam passes and a $-V$ signal is generated as the trailing or final edge passes. As previously noted, the magnetic sensor requires the detected mass to be in relatively close proximity, i.e., within a predetermined distance designated by the illustrated air gap in FIG. 3. In other words, the magnetic sensor is not responsive to the main body or mass of the disc itself but only to the mass of the cam or projection when it passes. In FIG. 4, a schematic chart illustrates the output from the magnetic sensor as a block of metal passes from left to right in close proximity, i.e., within the distance of the illustrated air gap. The block represents the portion of the wheel along which the measurement is being made. The block is shown approaching in a position 1, with its leading edge at the magnet pole in position 2, passing the magnet in positions 3, 4, and 5, with its trailing edge leaving the magnet pole in position 6, and receding at position 7. At the bottom of FIG. 4 is a voltage curve in which corresponding points are marked with the same numbers as that of the positions of the block of metal. Note that a positive portion starts to rise at positions 1 and 2 and peaks for a full detection just as the leading edge reaches the center of the magnet pole in position 3. This voltage returns to 0 level when the block is fully in position (4) at the pole. This 0 voltage signal point may extend for a longer period, i.e., create a flat portion of the curve, if the block is longer. The $-V$ peak occurs as the trailing or final edge passes the magnet pole center in position 5. This $-V$ signal curves off to 0 as the block passes and recedes in positions 6 and 7. The sensor device may be adjusted to output a signal only at positions 3 and 5 if desired. FIGS. 3 and 4 thus illustrate how the moving wheel with its rim and flanges will generate similar outputs as it passes a sensor device illustrated in FIG. 2.

For further explanation of the operation of the arrangement of the invention, I refer now to FIG. 5 which is a schematic plan view of a stretch of rail with associated sensor devices for measuring the wheel parameters. The horizontal double line at the center of the drawing figure represents the top of a rail, or as designated, the rail head, along which each wheel rolls in the direction from left to right as indicated. Along each side of this rail are a plurality of sensor devices shown by conventional blocks. As previously described, these are assumed for convenience to be magnetic type proximity sensing devices with characteristics and output signals equivalent to those shown in the charts of FIGS. 3 and 4. The sensors shown below the rail symbol in this plan view measure the chord on the outside diameter of the wheel tread designated by the distance X in FIG. 1. These sensors are designated by the letter T with various numerical suffixes. Those sensors shown above the rail symbol measure the chord on the diameter of the wheel flange designated by the distance W in FIG. 1 and are designated by the symbol F with various numerical suffixes.

The final sensors of each plurality in the direction of the wheel movement, designated by the symbols T1 and F1, respectively, are located on opposite sides of the rail at a selected point which in most installations will be located so that the cars pass this point prior to entering the area in which the yard control system functions. Sensor T2 is then located a distance designated as X28 in approach to sensor T1, the distance X28 being the length of the chord X on a 28" diameter wheel, one of the standard wheels presently used on railroad cars. Sensors T3, T4, and T5 are also located in the approach at distances designated as X33, X36, and X38, respectively, which represent the length of a chord X on wheels having diameters of 33", 36", and 38", respectively. These four designated diameters represent the standard wheel diameters presently in use on railroad cars with the 33" wheel being the most common. It is to be noted, however, that if other wheel diameters are to be used, the arrangement of my invention can be modified very easily in an obvious manner to accommodate such other diameters. The distances W28, W33, W36, and W38 separating sensor F1 and the other approach sensors F2, F3, F4, and F5, respectively, represent the length of the chord W (FIG. 1) for wheels of these same conventional diameters. The slightly longer distances between F1 and its approach sensors are due to the fact they are measuring chords on the flange diameter of the wheels which are of slightly longer lengths. It is to be understood that the order in which the various sensors are located along the rail may be reversed, and the logic circuitry reordered, so that a wheel first encounters, for example, sensor T1 and its associated auxiliary sensors, then, after the space, encounters sensors T2, T3, T4, T5 in that order.

By way of a specific example, I shall assume that a wheel with a nominal 33" diameter moves along the rail from left to right. As indicated in FIG. 4, the +V pulse or signal from each sensor T is produced as the leading edge of the tread (chord X) passes that sensor. As the leading edge of the wheel passes sensor T1, the rear edge of chord X is passing sensor T3. The +V signal from sensor T1 and the associated −V signal from sensor T3 are applied to a logic arrangement shown by the conventional block designated as a Diameter Measuring Logic. This logic circuitry or apparatus is preconditioned so that the simultaneous input of opposite polarity signals from sensors T1 and T3 actuates the logic means to register the passage of a 33" wheel. In a similar manner, the logic means is preconditioned so that the simultaneous input of opposite polarity signals from sensor T1 and sensor T2, T4, or T5 actuates a registry of the passage of a 28", 36", or 38" wheel, respectively. To permit the registry of the actual diameter of worn wheels, similar sensors T1A, T1B, and T1C are positioned in the immediate approach to sensor T1 and very closely spaced therewith. This is equivalent to a vernier relationship between the associated sensors and sensor T1. For example, simultaneous signals of +V and −V from sensors T1B and T3, respectively, may be used to actuate the registry or indication of the passage of a 32" wheel, worn down from the nominal or standard 33".

The registered wheel diameter in the diameter measuring logic means is applied, in a form consistent with the type of control sytem, to the yard control system shown by the conventional block which includes not only the speed control arrangement for controlling the coupling speeds but also such other control and information handling apparatus as is used in the overall control system. As one use, this wheel diameter data is used by the control system to compute, in accordance with a predetermined algorithm, or to retrieve frm a precalculated data bank, a rotational inertia factor for that car. This factor is combined with previously listed car parameters, i.e., weight, rolling resistance, etc., and with fixed and variable information of the selected storage track, i.e., grade, curvature, distance-to-go, etc., in computing a speed at which that car should enter the yard storage area in order to couple safely with previously stored cars. Those skilled in the art will have sufficient understanding of the types of control arrangements available and their general operation to understand the relationship of my present invention.

Typically the radial depth or thickness of the tread, i.e., the measurement T in FIG. 1, is $2\frac{1}{2}"$ or less. Actually, the $2\frac{1}{2}"$ measurement is standard only for a new 33" wheel while other diameter wheels have less tread thickness, normally about $1\frac{1}{4}"$ new. The sensors T are therefore positioned at this maximum height above the rail top. In other words, height Z in FIGS. 1 and 2 is $2\frac{1}{2}"$ to match the thread thickness on the most commonly used wheel. For unworn tread on a 33" wheel, there is no Y measurement (FIG. 1) since sensor T3 does not break into an open space as the wheel passes. However, for such wheels with worn treads, and for wheels of other diameters, sensor T3 breaks into an open space as the wheel passes. This completes an initial cycle of the + and −V signals for a partial measurement along chord X but does not actuate a diameter registry. A second cycle of voltage signals is then output after the Y distance or space ends, as sensor T3 detects the passage of the portion of the wheel tread along the remainder of distance X. The second −V signal occurs simultaneously with the +V output from one of the associated sensors T1A, B, or C, depending upon the amount of wheel wear, to register the actual diameter of this nominal 33" wheel. The dual cycle of signals from sensor T3 is, of course, applied to the logic circuitry. Since the first −V signal occurs when there is no output from sensor T1 or its associated vernier sensors, the logic apparatus registers the initiation of the measurement of distance Y. The occurrence of the second +V signal from sensor T3 ends this Y measurement. Thus, the logic circuitry actuates the registry of a measurement of the distance Y as a wheel with worn tread passes. Capability is also provided for detecting when this distance Y is greater than a predetermined percentage of the X measurement which indicates a tread thickness less than a predetermined safe minimum for that particular standard wheel diameter. Either the logic apparatus or the yard control system then provides and registers a warning indication of an unsafe wheel, i.e., a condemned wheel which must be replaced. For 33" diameter wheels, the minimum permitted tread depth at the present time is $\frac{3}{4}"$, while for other diameter wheels the minimum tread is $\frac{7}{8}"$, reduced from the $1\frac{1}{4}"$ new wheel tread thickness. In FIG. 5, this action is indicated by the unsafe wheel indication block, shown controlled by the yard control system apparatus so that unsafe flange conditions, discussed shortly, may also be displayed.

On the other side of the rail, the sensors F operate in a similar manner to detect the diameter of the wheel through the flange by measuring the chord distance W. This provides the base to determine the existing flange height of the wheel, the measurement F in FIG. 1. The correlation between the measurements of chords W, X, and Y will be accomplished by the yard control system in order to determine whether sufficient flange height remains for safe operation of the car and wheel. Although not shown here, additional subordinate sensors, spaced immediately adjacent to sensor F1, may be used to provide varying measurements as wear of the wheels occurs so that the flange height may be more accurately determined.

The arrangement of my invention thus provides, in a simple and convenient manner, for automatically measuring the diameter of car wheels moving along a track rail. The plurality of sensing devices detect the passage of selected portions of the wheel tread and from this measurement provide an output indicating the existing wheel diameter. The actual distance measured along the preselected chord of the wheel is converted by a preconditioned logic circuit arrangement into a corresponding wheel diameter. As measurements of other parameters are desired, additional input signals to the logic means may be correlated to provide such indications as the tread radial thickness and, from the other side of the same rail, the diameter through the outside of the wheel flange. These measurements are converted by the yard control system into a wheel rotational inertia factor for the car which is incorporated into the speed control computations. The tread thickness and flange height measurements may also be correlated to provide an indication of the safety conditions of the wheel. All of this is accomplished with a minimum of apparatus and provides accurate and reliable measurements for use in the control system for the railroad yard.

Although I have herein shown and described but one specific arrangement of apparatus for measuring the parameters of car wheels, it is to be understood that various modifications and changes may be made therein within the scope of the appended claims without departing from the spirit and scope of the invention.

Having now described the invention, what I claim as new and desire to secure by Letters Patent, is:

1. A railroad car wheel measuring apparatus comprising,
   (a) a plurality of sensor devices spaced along a rail on which a car wheel travels, each sensor device responsive to the passage of an initial and a final point along a selected chord of the wheel for generating a distinct output signal to mark the passage of that point,
   (b) a first and a second of said sensor devices being spaced a selected distance equivalent to the distance along said selected chord of a wheel having a first diameter,
   (c) each other higher numbered sensor devices representing larger diameter wheels being spaced farther from said first device and a selected distance from the next lower numbered device equivalent to the increment in said selected chord of the corresponding wheel over that of the next smaller wheel, and
   (d) logic apparatus connected for receiving said output signals from each of said sensor devices upon the passage of said initial and final points along said selected chord of a wheel and responsive for registering the diameter of that wheel in accordance with the second or higher numbered sensor device paired with said first sensor device to simultaneously supply signals representing said initial and final points on said chord.

2. Car wheel measuring apparatus as defined in claim 1 in which,
   (a) said sensor devices are positioned along said rail so that a car wheel passes said devices in reverse numerical order, and
   (b) said logic apparatus is responsive for registering a wheel diameter corresponding to the sensor device supplying a distinct final point signal simultaneous with said first sensor device supplying a distinct initial point signal.

3. Car wheel measuring apparatus as defined in claim 1 in which,
   (a) said sensor devices are positioned along said rail so that a car wheel passes said devices in numerical order, and
   (b) said logic apparatus is responsive for registering a wheel diameter corresponding to the sensor device supplying a distinct initial point signal simultaneous with said first sensor device supplying a distinct final point signal.

4. Car wheel measuring apparatus as defined in claim 1 in which,
   (a) each sensor device is a magnetic proximity detector responsive to the passage of the initial point on said chord to output a first polarity signal and to the passage of the final point on said chord to output an opposite polarity signal,
   (b) said logic apparatus is responsive to the simultaneous reception of a pair of opposing polarity signals for registering the diameter of a passing wheel in accordance with the second or higher numbered sensor device paired with said first sensor device to supply the simultaneous opposing polarity signals.

5. Car wheel measuring apparatus as defined in claim 1 which further includes,
   (a) control means connected for receiving each registered diameter from said logic apparatus and responsive thereto for determining the corresponding rotational inertia factor for that wheel in accordance with the registered size of its diameter,
   (b) said control means operable for computing a desired speed for each car, whose wheel diameters have been measured by said plurality of sensor devices, in accordance with selected parameters of the car and track including said wheel rotational inertia factor.

6. Car wheel measuring apparatus as defined in claim 5 in which,
   (a) the distance between said first sensor device and each other sensor device of said plurality is equal to said selected chord length on an unworn wheel having the corresponding diameter,
   and which further includes,
   (b) a selected number of additional sensor devices positioned closely adjacent to said first sensor device and in consecutive order toward said second sensor device, the spacing between said first sensor device and each additional sensor device representing a selected increment of wear of a wheel,
   (c) said logic apparatus responsive to simultaneous distinct signals from any one of said additional sensor devices and one of said second and higher numbered sensor devices for registering a wheel of worn diameter corresponding to the nominal diameter represented by said second or higher numbered sensor device.

7. Car wheel measuring apparatus as defined in claim 6 in which,
   (a) said plurality of sensor devices are located along one side of said rail and positioned at a predetermined height above the top of said rail so that said selected chord which passes in close proximity to said sensor devices is on the tread side of each wheel,
   (b) each sensor device is responsive to a gap along said selected chord, as the tread face passes, for supplying an additional set of final and initial point signals to said logic apparatus,
   (c) said logic apparatus is responsive to the reception of two sets of signals from a particular sensor device, other than said first device, corresponding to the registered diameter of a wheel during its passage, for registering the length of said gap in said selected chord on the wheel tread at the sensor device height,
      (1) said logic apparatus connected for supplying both the registered diameter and gap length information to said control means,
   (d) said control means is responsive to each set of associated diameter and gap length information for determining the radial tread thickness of that wheel and for computing the rotational inertia in accordance with wheel diameter and tread thickness.

8. Car wheel measuring apparatus as defined in claim 7 in which,
said control means is further responsive to the input signals for comparing the registered gap length and the registered diameter received for a particular wheel and for actuating a warning indication when said gap length exceeds a predetermined length, different for each possible diameter, indicative of a dangerously worn wheel condition.

9. Car wheel measuring apparatus as defined in claim 8 which further includes,
 (a) another plurality of sensor devices including a first sensor device and higher numbered devices spaced at other selected distances along the opposite side of said rail at said predetermined height,
 (b) each sensor device of said other plurality responsive to the passage of initial and final points of a selected chord on the flange side of each wheel for generating said distinctive output signals,
 (c) another logic apparatus connected for receiving said output signals from said other plurality of sensor devices and responsive thereto for registering a wheel diameter measurement including the wheel flange, and
 (d) said control means connected for also receiving said diameter measurements from said other logic apparatus means and operable for comparing the received measurements to determine tread depth and flange height of each wheel and for indicating when such distances are within predetermined safety limits for each particular wheel.

10. Apparatus for determining the rotational inertia of a railroad car wheel rolling along a track rail, comprising in combination,
 (a) a plurality of sensor devices mounted along one side of said rail and positioned a predetermined height above the top of the rail so that a preselected chord on the car wheel face passes in close proximity to each sensor device,
  (1) each sensor device being responsive to the passage of the leading and trailing edges of a wheel along said chord for generating distinct output signals,
  (2) the final sensor device passed by each wheel being spaced from each other sensor device by selected different distances, each representing one of the different diameters of wheels moving along said rail,
 (b) logic circuit means connected for receiving said output signals from said sensor devices and responsive to simultaneous leading and trailing edge signals from said final sensor device and a particular one of said other sensor devices, respectively, for registering a diameter for that wheel corresponding to the spacing distance of said particular sensor device from said final sensor device, and
 (c) control means connected for receiving the registered wheel diameter from said logic circuit means and operable for determining the rotational inertia of that wheel in accordance with the received diameter information,
 (d) said control means operable for controlling the speed of cars traversing the track in accordance with selected parameters including said rotational inertia of all wheels of each car.

11. Apparatus for determining the rotational inertia of a car wheel as defined in claim 10 in which,
 (a) said sensor devices are mounted on the wheel tread side of said rail and positioned at a height so that said preselected chord is measured on the wheel tread,
 (b) each sensor device is responsive to the initial and final edge of a gap in said preselected chord, due to a thinner tread thickness, for outputting an additional pair of trailing and leading edge signals intervening between the signals designating the ends of said chord,
 (c) said logic circuit means is responsive to two pairs of leading and trailing edge signals from said particular other sensor device during the passage of a single wheel for also registering the radial thickness of the wheel tread, and
 (d) said control means is responsive to the reception of registered wheel diameter and tread thickness information from said logic circuit means for computing the rotational inertia of that wheel in accordance with the received wheel information.

12. Apparatus for determining the rotational inertia of a car wheel as defined in claim 11 which further includes,
 (a) another plurality of sensor devices mounted along the opposite side of said rail at said predetermined height so that another preselected chord on the flange side of each wheel passes in close proximity to each sensor device,
  (1) each sensor device of said other plurality responsive to the passage of leading and trailing edges of a wheel along said other preselected chord for generating distinct output signals,
  (2) the final sensor device and each other other sensor device of said other plurality being spaced by a selected different distance representing the diameter including the wheel flange of one of the different size wheels moving along said rail, and
 (b) another logic circuit means connected for receiving said output signals from said other plurality of sensor devices and responsive to simultaneous leading and trailing edge signals from said final sensor device and a particular one other sensor device, respectively, for registering a flange diameter for that wheel corresponding to the spacing distance for that particular other sensor device,
 (c) said control means connected for also receiving said registered diameters from said other logic circuit means and operable for comparing both registered diameters to determine flange height,
  (1) said control means further responsive to the determined flange height and computed tread thickness for determining the safety condition of that wheel.

13. Apparatus for determining the rotational inertia of a car wheel as defined in claim 12 in which,
 (a) each sensor device is a magnetic pickup device responsive to the passage of the leading and trailing edges on a chord to output a first and a second polarity signal, respectively,
 (b) each said logic circuit means is responsive to the simultaneous reception of a pair of first and second polarity signals for registering the corresponding diameter of a passing wheel in accordance with the associated pair of sensor devices including the corresponding final sensor device from which the signals are received,
 (c) the first-mentioned logic circuit means is further responsive to the reception of an intervening pair of first and second polarity signals for registering the radial thickness of the tread on the corresponding wheel.

* * * * *